March 8, 1938. E. A. TAYLOR ET AL 2,110,344
ART OF ORTHOPTIC TRAINING
Filed Aug. 7, 1935 2 Sheets-Sheet 1
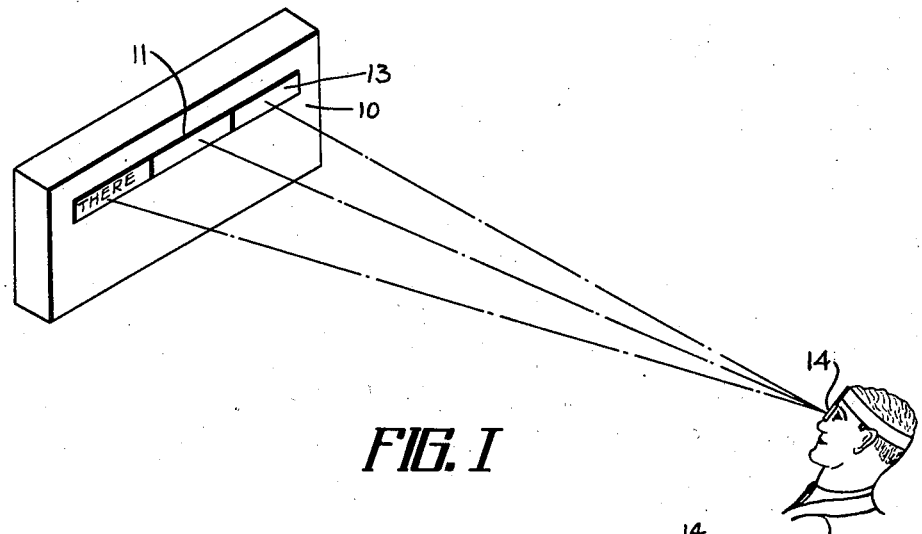
FIG. I
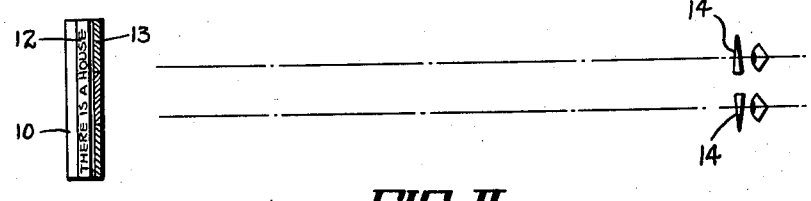
FIG. II
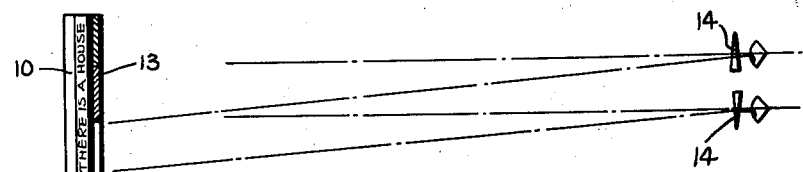
FIG. III
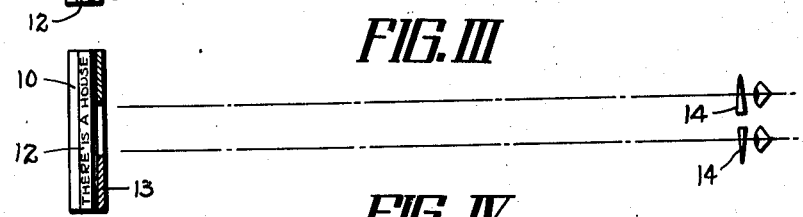
FIG. IV
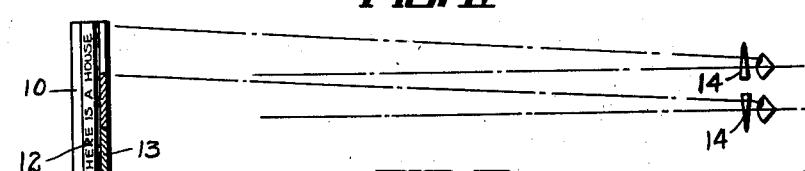
FIG. V
INVENTOR
James Y. Taylor
Carl C. Taylor
Earl A. Taylor
BY Harry H. Styll
ATTORNEY March 8, 1938.  E. A. TAYLOR ET AL  2,110,344
ART OF ORTHOPTIC TRAINING
Filed Aug. 7, 1935  2 Sheets-Sheet 2
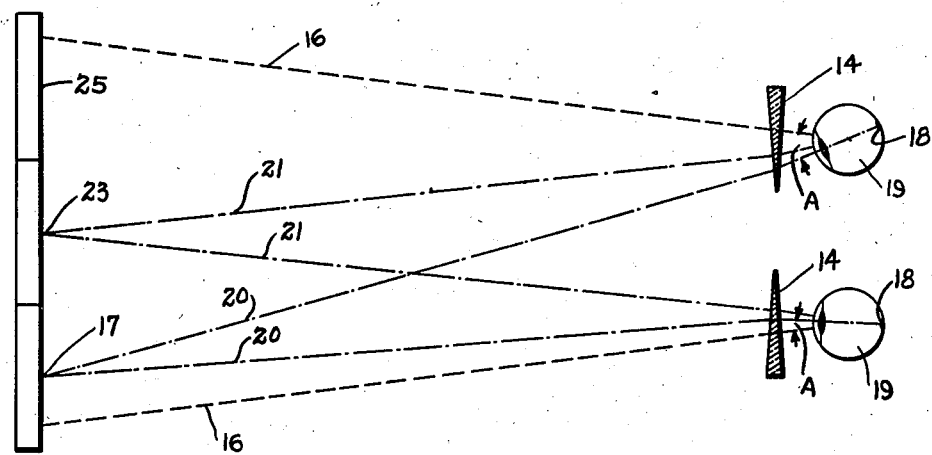
FIG. VI
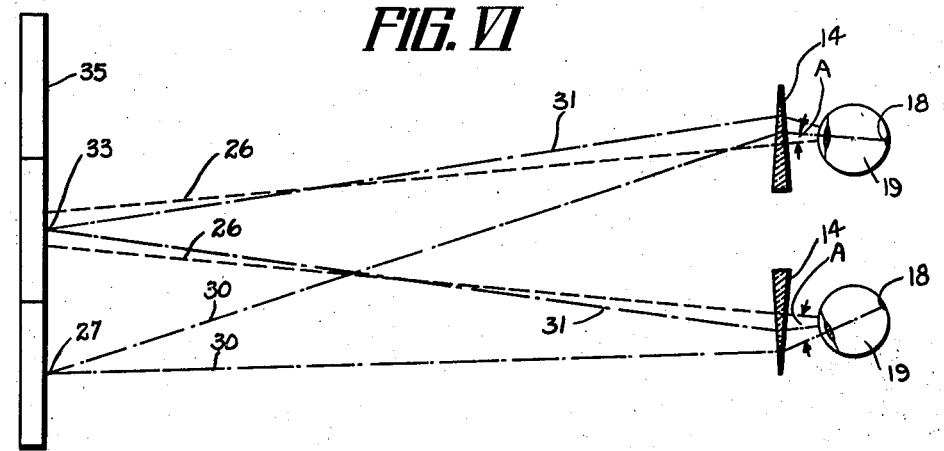
FIG. VII
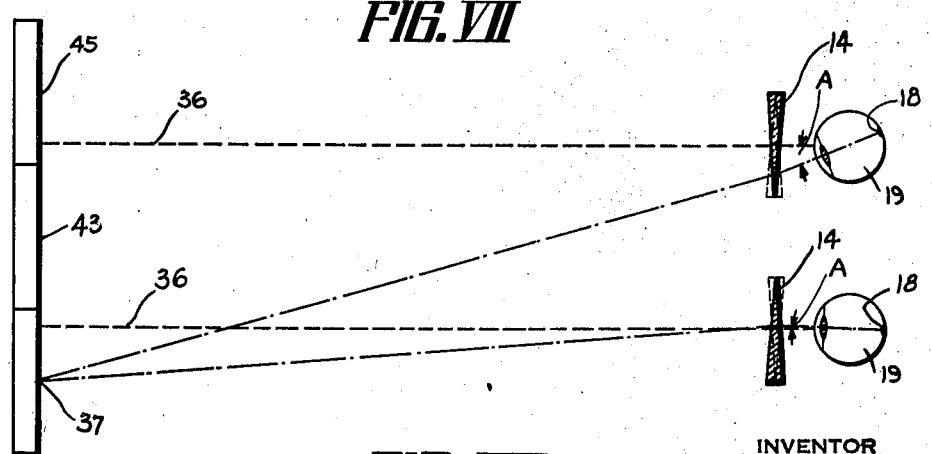
FIG. VIII
INVENTOR
James Y. Taylor
Carl C. Taylor
Earl A. Taylor
BY Harry H. Styll
ATTORNEY Patented Mar. 8, 1938

2,110,344

UNITED STATES PATENT OFFICE 2,110,344

ART OF ORTHOPTIC TRAINING

Earl A. Taylor, Austin, Tex., James Y. Taylor, Southbridge, Mass., and Carl C. Taylor, Brownwood, Tex., assignors to Educational Laboratories, Inc., Brownwood, Tex., a corporation of Texas Application August 7, 1935, Serial No. 35,128

5 Claims. (Cl. 88—20)

This invention relates to new and useful improvements in means and method of orthoptic training and particularly relates to means and method for increasing the ability of a person to read with greater speed and accuracy.

This application is a continuation in part of copending application, Serial Number 737,560, filed July 30, 1934.

Developments in binocular photography of persons' eyes during reading have shown graphically why some persons can read with much greater speed and accuracy than others.

These developments indicate that the movements of the eyes during reading are a series of intermittent movements from one end of the line to the other, instead of a smooth continuous movement. For speed and accuracy in reading it is essential that both eyes move from one fixation point to the next in rhythmical steps. It has also been demonstrated that the speed and comprehension of the person during reading is very closely related to the number of steps or pauses per line and the number of regressive movements per line. Failure of the eyes to coordinate and fixate on the same subject matter or symbols increases the number of pauses and regressive movements of the eyes necessary to maintain a connected trend of thought. The inability of the patient to control his eye movements to maintain binocular fixation is usually due to muscular imbalance or an imbalance in the innervation efficiency of the extrinsic muscles, or in other words, improper duction ratio.

There is a very close connection between convergence of the eyes and the power of accommodation. If there is an unbalanced relationship between these functions, binocular fixation is difficult. Accommodation is an involuntary action and the only way to exercise such functions is by means and methods of orthoptic training which stimulate this involuntary action. Furthermore, such exercises must develop coordination of the functions of accommodations with the functions of orientation of the eyes. A person may be able to obtain apparently normal binocular vision either with or without corrective lenses for short periods of time and for certain distances and certain kinds of work and yet not be able to do other kinds of work with efficiency or without greatly fatiguing the mental and physical systems. When the mental and physical systems are fatigued, efficient vision and perception are greatly impaired and the outward appearances may be a lack of cooperation between the accommodation and orientation functions of the eyes. This may be due to normally weak muscles or a deficiency in the innervation of these muscles or weakness created by abnormal strains resulting in fatigue.

When a person has been suffering from unequal vision in the separate eyes for an extended period of time, whether the defect is due to refractive errors or muscular errors, inefficient motor habits as during reading or fast intermittent vision may become so thoroughly established as to remain after the physical or physiological causes have been remedied or neutralized.

It is, therefore, apparent that the muscles to be exercised and coordinated for reading purposes are primarily those which maintain binocular fixation during reading and which move the eyes from the end of one line to the end of another.

Prior to our invention, devices and methods of orthoptic training have been developed which produce beneficial exercising of the eyes, but these prior methods do not stimulate the minute eye adjustments so necessary in reading. That is, no method was devised which developed fine coordination between convergence and accommodation, while using the same lateral motion ordinarily employed in the reading process.

Accordingly, one of the principal objects of the invention is to produce a novel method and apparatus for exercising and stimulating the coordination of the extrinsic muscles of the eyes with the accommodative functions which are used during normal reading.

Another object is to provide a method by which the coordination of the extrinsic muscles of the eyes and the accommodative functions are developed by producing involuntary mental reactions.

Another object is to provide a novel method for increasing the visual mental perception of a person by training the eyes to make synchronous or rhythmical steps while interpreting thought conveying indicia.

Another object is to provide an improved method of training the eyes of a patient to make binocular fixations on subject matter embracing a predetermined angle of vision through refractive devices whereby the extrinsic muscles of the eyes will be placed under a variable strain during the successive fixations.

Another object is to provide a novel method of orthoptic training by causing a person to view intermittently exposed symbols or indicia, the whole of which serves as the fixation field, through refractive devices which cause the eyes to deviate in controlled directions and by controlled amounts from their position of nonuse or rest, whereby the extrinsic muscles of the eyes will be exercised in causing the eyes to be moved from said nonuse position or position of rest, to which the eyes tend to return during the period of motion blindness, while the eyes are moving from one field of fixation to another.

Other objects and advantages of the invention will become apparent from the following description taken in connection with the accompanying drawings, and it will be apparent that many changes may be made in the details of construction, arrangement of parts, steps of the method shown and described, without departing from the spirit of the invention as expressed in the accompanying claims. We, therefore, do not wish to be limited to the exact details and steps of the method shown and described as the preferred forms only have been shown in the way of illustration.

Referring to the drawings:

Fig. I is an isometric view of an apparatus for performing the method of the invention.

Figs. II to V are diagrammatical views showing the manner in which the eyes of the patient are caused to fixate successively at spaced intervals.

Fig. VI is a diagrammatic view of the manner in which eyes affected by divergent squint or eyes having a tendency to turn out are exercised using base-out prisms.

Fig. VII is a diagrammatic view of the manner in which eyes affected by convergent squint or eyes having a tendency to turn in are exercised using base-in prisms.

Fig. VIII is a diagrammatic view of the manner in which otherwise normal eyes are exercised by using prisms to develop duction power.

In the drawings, the numeral 10 designates an educational device which has an elongated window 11 in its front wall. The device has a roll 12 carrying indicia mounted to travel therein and the indicia is displayed through the window 11. The window is normally closed by a trio of vertically sliding panels 13 and, as shown in Fig. I, each panel covers substantially one-third of the window. The panels are arranged to be slid downwardly consecutively from left to right, whereby the line of indicia opposite the window is displayed in portions from left to right. As soon as all three panels are operated, the roll 12 is operated to bring the next line of indicia opposite the window. The details of this device are fully set forth in the patent to J. Y. Taylor, issued July 18, 1933, No. 1,918,298. Although we have shown this particular device in connection with our improved method, it is to be clearly understood that any device which will display a line of indicia a portion at a time consecutively, progressively in the direction of normal reading, may be employed.

In carrying out the improved method, the patient is seated at a suitable distance from the displaying device. Prisms 14 of suitable strength and having the desired direction of displacement are placed before the patient's eyes. The use of prisms is old in the art, but the proper positioning and use of said prisms while causing the person to view intermittently displayed spaced indicia serves to give the eyes new and beneficial exercise when overcoming the power of the prisms, as will be more fully pointed out hereafter.

After the prisms are properly adjusted, the patient then reads the indicia displayed by the device 10. The panel 13 at the extreme left of the device first slides downwardly, thereby displaying the first portion of the line of indicia. This causes the patient's eyes following the exposures to move to this section of the line as shown in Fig. III. The panel then rises, the central panel being slid downwardly, causing the eyes to move to the position shown in Fig. IV. The central panel is then raised, the panel on the right sliding downwardly and causing the eyes following the exposures to move to the position shown in Fig. V. The roll is then operated to bring the next line of indicia opposite the window and the panels are again operated in order.

With particular reference to Figs. VI, VII, and VIII, the manner in which the extrinsic muscles of the eyes are exercised in overcoming the power of the prisms by causing the eyes to move through an angle indicated at A is shown. Fig. VI represents the condition of eyes affected by exophoria or eyes having a tendency to diverge such as a divergent squint, the broken lines 16 indicating the axes of vision of the eyes during the period when fusion of the eyes is broken or when the eyes are in the position of rest.

The line of vision 16 shows the positions to which the eyes will tend to return during periods of motion blindness, that is, when the eyes must be moved from one fixation field to a successive fixation field spaced from the preceding one.

A fixation field on which the eyes are tending to converge may be represented by a point 17, which is located at approximately the center of the exposed field of reading matter which is displayed successively. The exposed field of fixation is preferably embraced within an angle of vision of such size as to allow the patient to mentally perceive the whole thereof at one fixation. The prisms 14 are placed with the bases out for eyes having a tendency to diverge and are of such a power that the eyes must turn inwardly an amount controlled by the prism power and more than without prisms, in order to converge on a fixation field to make the light rays 20 from point 17 fall on the maculas 18 of the eyes 19, thereby maintaining fusion. For eyes which actually do diverge so much that no binocular vision occurs, it may be necessary to start with prisms base in in order to assist the muscles in obtaining fusion until a certain improvement is effected, then continue making the muscles do more and more work by increasing or decreasing the prisms or by putting the prisms base out as the muscles of the eyes are able to maintain fusion with less and less aid from the prisms. Since the indicia is intermittently displayed, the period of motion blindness is accentuated thus giving the eyes time to tend to return to their positions of rest indicated at 16. When the succeeding fixation field, indicated as a point 23, is displayed before the eyes, the rectus muscles of the eyes are required to move the eyes back from their positions of rest 16 to the positions indicated at 21. The movement of the axes of vision of the eyes 19 from the positions 16 to the positions 20 and 21 indicated generally by the angle A is what exercises the internal and external rectus muscles of the eyes and thereby produces a muscular balance between these muscles of the eyes so that fusion may be quickly and accurately established by the patient on the successively displayed portions of reading matter. It will be understood that a similar exercise takes place when the eyes move to the fixation point 25. The ability to quickly establish and maintain fusion on successive portions of reading matter is very closely related to speed and accuracy in reading, since the person is able to quickly concentrate on successive portions of reading matter and readily grasp the thought conveyed, thereby reducing the number of fixations per line, as well as discourage the eyes from making regressive movements.

In Fig. VII the condition of esophoria or eyes having a tendency to converge, such as a convergent squint, is illustrated. The line of vision of the convergent eyes takes a position of relaxation indicated at 26 when fusion of the eyes is broken. When the eyes maintain fusion on the point 27, with the prisms being formed to a controlled power and turned with base in, the axes of vision must be rotated outwardly relative to each in order to receive the rays 30 from the point 27. The lines 31 indicate the rays from the fixation point 33 when the eyes are turned to maintain fusion through the base in prisms on the latter point. It is to be understood that the eyes 19 will tend to return to the positions indicated by the broken lines 26 during the interval of movement from the fixation on the points 27 and 33, thereby exercising the eye muscles while rotating the eyes through the angle A. It will be noted that the angle A will be greater for one eye at one time and greater for the other eye at another time, depending upon the relative positions of the fixation point and the eyes. Conversely to the case of divergent squint, for eyes which actually do converge so much that no binocular vision occurs, it may be necessary to start training with prisms base out in order to assist the muscles in obtaining fusion until a certain improvement is effected, then continue making the muscles do more and more work by increasing or decreasing the prisms or by putting the prisms base in as the muscles of the eyes are able to maintain fusion with less and less aid from the prisms.

The condition of training for eyes otherwise normal but having a poor duction ratio is shown in Fig. VIII. The axes of vision 36 are parallel during the periods of relaxation and the axes tend to return to these positions during the periods of motion blindness. If it is desired to increase the reserve neural innervation efficiency of the internal rectus muscles, the patient is caused to read the intermittently displayed matter through prisms with base out. The use of such prisms for increasing duction ratio are used to cause the eyes to turn inwardly farther than they would do in viewing the same fixation points 37, 43, and 45 without the use of prisms, the power of said prisms being increased or decreased to vary the duction ratio. Such exercise builds up a reserve of muscular response to brain stimulations, which makes it possible for the brain to more quickly orient the eyes in order to obtain fusion in the shortest possible time. It is this ability to quickly produce ocular orientation that produces one factor that stimulates and increases the mental perceptive faculties and consequently increases a person's reading speed.

It is to be understood that the patient would be given training while viewing through prisms with base in if the innervation efficiency of the external rectus muscles is deficient. By proper amount of training the duction ratio, that is the ratio of prism power with base out to the ratio of prism power with base in through which the patient is able to maintain binocular vision, may be developed to any desired amount within limits.

Weaknesses or innervation deficiencies of the internal or external rectus muscles may cause the person's eyes to overconverge or underconverge during reading. By increasing the duction ratio so that there is the proper balance of muscular effort the eyes can be aided in quickly establishing and maintaining fusion. By taking binocular photographs of the movements of the eyes while reading intermittently displayed accommodation stimulating indicia, it can be readily determined whether the innervation deficiencies produce overconvergence or underconvergence and exercises can be given accordingly which will overcome the condition.

In order to use the apparatus and method of our invention so far described, it is preferable to first perform tests on the eyes to determine the causes of inefficient fusion and poor reading. The person may be checked by procedures well known to determine errors of refraction, and by photographically recording the movements of the two eyes simultaneously on a single film, the relative movements of the eyes during reading may be ascertained. An apparatus for taking such binocular records is described and claimed in copending application, Serial Number 711,942, filed Feb. 19, 1934. By seating the patient before the apparatus described in said copending application, and causing said person to read matter before his eyes under conditions simulating normal reading, a binocular record made by the apparatus will show a time record of the relative movements of the eyes and whether the patient is able to quickly orient and fix the two eyes on a selected field of fixation indicia. When the patient is caused to observe reading matter or any accommodation stimulating indicia through prisms with base up in front of one eye and base down in front of the other and of such values as to produce double vision with one image above the other, a comparative binocular record of the eyes when they are acting monocularly is obtained. Since the stimulation before each eye is the same and the eyes are acting monocularly their relative reactions are very clearly recorded and may be compared.

When the patient is suffering from amblyopia, suspension or amblyopia ex anopsia, causing the good eye to see to the partial or whole exclusion of the bad eye, prisms should be placed in front of the eyes of the patient; a base-up prism in front of one eye and base down in front of the other. The prisms should be of such power as to produce diplopia or double vision in the brain. The patient is then allowed to read the intermittently displayed subject matter, causing the eye of lower visual acuity to be subjected to fine minute adjustments of the muscular structure ordinarily used in reading. By causing diplopio by use of base up and base down prisms while the patient is viewing intermittently displayed accommodation stimulation indicia, such as reading matter forming a story, the emmetropic or good eye produces a brain stimulation from the reading matter and causes the other eye to try to imitate the image stimulations from the good eye. Thus the good eye acts as a leader. It is rarely ever necessary to occlude the eye of the greater visual acuity when trying to stimulate the poor eye back to good visual acuity through vertical displacement of the images and causing the person to view the intermittently displayed symbols. It is desirable that the effective focal plane of the symbols be varied while the patient is caused to read the symbols through the base up and base down prisms, thereby greatly stimulating the focusing functions of the eye, which reduces the time necessary to develop good visual acuity in the poor eye. The effective focal plane of the symbols may be changed by the use of lenses of different powers or by changing the distance between the patient and the reading matter. It is to be noted here that during the use of the base up and base down prism training, care must be taken that the prisms in front of each eye be alternated from base up to base down and vice versa in order that a condition of hypertropia will not be developed in the patient. The exercise described tends to establish a balance of visual efficiency or acuity between the eyes. After the visual efficiency of both eyes has been developed to about the same degree, the patient is given reading exercises with or without the use of prisms to further train coordination of the eyes for most efficient reading habits.

The tendency of the eyes to develop an equalization of visual efficiency by the training above described, may be explained psychologically, physiologically or by combination. Hundreds of cases have shown that the training above described is very effective in increasing the reading speed of persons whatever the theory may be. It is important that the indicia be such as to stimulate accommodation because without substantially equal accommodation in both eyes there cannot be quick fusion, which is essential to efficient visual mental perception.

As far as we have been able to determine, the production of diplopia by use of base up and base down prisms and causing the eyes to view the intermittently displayed reading matter, or other accommodation stimulating matter, is the most efficient way of teaching or causing the eye of lower visual acuity to regain its visual acuity and at the same time cause or teach it to function as a separate unit. In some cases it is necessary to inhibit or stimulate accommodation ahead or behind convergence while reading the intermittently exposed symbols, by use of proper plus and minus lenses in order to get sufficient response from the eye of low visual acuity. The power of the lenses may be varied as greatly as possible during the reading since the lenses serve as relative stimulations and are only used for a short time. The learning to function as a separate unit is the greatest factor for discouraging suspension, and until suspension ceases, it is practically impossible to produce coordination between the eyes.

Although we do not wish to limit our invention to any specific theory, the effectiveness of our method appears to be dependent upon the natural reaction of the eyes of literate persons in trying to interpret reading matter. When a diplopic condition is produced, the eye of lower visual acuity is caused to make the fine minute changes necessary for best vision involuntarily but the patient is aware that he is using the amblyopic eye and this awareness is the primary condition which discourages suspension.

After the visual acuity has been developed to approximately the same degree in both eyes, the eyes are preferably given exercises of reading the intermittently displayed accommodation stimulating indicia through prisms with base in or base out to improve the duction ratio, as set forth above in order to obtain maximum coordination of the eyes, which coordination is necessary in developing and maintaining fusion.

When children are the subjects of the training herein described, pictures or number charts may replace the reading matter.

It is to be distinctly understood that by binocular fixation is meant that the axes of vision of the eyes of the person are maintained substantially fixed relative to each other and approximately on the same point simultaneously so that there is no confusion of brain stimulations created. The axis of vision as referred to in the specification and claims relates to the center line of all rays entering the eye and falling in the center of the macula of the eye. Fusion relates to the ability of the two eyes to obtain single binocular vision. In the specification and claims where reference is made to prisms, it is to be understood that the word "prisms" is used in a generic sense to include prisms or equivalent devices, such as mirrors. Where mention is made of movements of the eyes involved in reading it is to be understood to include also conditions requiring intermittent binocular fixation, such as viewing motion pictures.

Having described our invention, we claim:

1. A method of coordinating the functions of the eyes of an individual comprising intermittently exposing accommodation stimulating indicia in chronological sequence and in spaced progression in the normal direction of reading, causing the individual to view said intermittently exposed indicia single binocularly by optically deflecting the rays emanating from the indicia controlled amounts from their normal positions at which they would be intermittently viewed by normal eyes as determined by the particular deficiencies of the eyes of the individual attempting to view said indicia single binocularly to position said indicia within the fusional range of the eyes and causing intermittent stresses predominately on the deficient portions of the muscular structure of the eyes by further optically deflecting the rays emanating from the indicia while still maintaining the indicia within the fusional range so that said deflecting in combination with said intermittent exposures will introduce effort in obtaining and maintaining single binocular vision which will strengthen and innervate said deficient portion of said muscular structure.

2. A method of coordinating the functions of the eyes of an individual comprising intermittently exposing accommodation stimulating indicia in chronological sequence and in spaced progression in the normal direction of reading, causing the individual to view said intermittently exposed indicia through optical means which will optically deflect the rays emanating from the indicia an amount sufficient to bring the indicia within the fusional range of the eyes and yet so locate said indicia as to intermittently introduce stresses predominately on the deficient portion of the muscular structure of the eyes during the intermittent exposures of said indicia resulting from the effort of the eyes to obtain and maintain single binocular vision of said indicia during the period of exposure, which stress will strengthen and innervate said deficient portion of said muscular structure.

3. A method of coordinating the functions of the eyes of an individual comprising intermittently exposing accommodation stimulating indicia in chronological sequence and in spaced progression in the normal direction of reading, causing the individual to view said intermittently exposed indicia through optical means having characteristics which will optically deflect the rays emanating from the indicia an amount sufficient to bring the indicia within the fusional range of the eyes and so controlling the characteristics of said optical means as to locate said indicia by optical deflection a predetermined amount offset from the position at which said indicia should be located to compensate for the particular deficiencies of the eyes so as to cause stresses predominately on the deficient portion of the muscular structure of the eyes during the effort of the eyes to obtain and maintain single binocular vision of the indicia during the period of intermittent exposures of said indicia so as to cause intermittent stresses on said deficient portion of the muscular structure of the eyes which will strengthen and innervate said deficient portion.

4. A method of coordinating the functions of the eyes of an individual comprising intermittently exposing accommodation stimulating indicia in chronological sequence and in spaced progression in the normal direction of reading, causing the individual to view said intermittently exposed indicia through optical means having characteristics which will optically deflect the rays emanating from the indicia an amount sufficient to bring the indicia within the fusional range of the eyes and so controlling the characteristics of said optical means as to locate said indicia by optical deflection a predetermined amount offset from the position at which said indicia should be located to compensate for the particular deficiencies of the eyes so as to cause stresses predominately on the deficient portion of the muscular structure of the eyes during the effort of the eyes to obtain and maintain single binocular vision of the indicia during the period of intermittent exposures of said indicia so as to cause intermittent stresses on said deficient portion of the muscular structure of the eyes which will strengthen and innervate said deficient portion and controlling the speed of said intermittent exposures according to the response of the deficient portion of said muscular structure of the eyes to said treatment.

5. A method of coordinating the functions of the eyes of an individual comprising exhibiting fixation indicia to the view of said individual a section only at a time in spaced progression and sequence in the direction of reading, causing the eyes of said individual viewing said fixation indicia to consecutively and periodically break and reestablish fusion while displacing the images of said intermittently exhibited sections of indicia by an amount which is controlled, in part, to overcome the tendency of the eyes to deviate so as to bring the images of said intermittently exposed sections of indicia initially within the fusional range of the eyes and which is controlled, in part, to simultaneously position the images of the said intermittently exposed sections of indicia controlled amounts offset from a position which would completely compensate for said tendency to deviate so as to introduce stress on the eyes when tending to obtain and maintain single binocular vision of said images and direct said stress predominately to the deficient portion of the muscular structure of the eyes as the organism of the eyes responds to said intermittently exposed sections of indicia and, in intermittently overcoming said stress, strengthen and innervate the said deficient portion so as to bring about a more effective control of the whole visual mechanism.

EARL A. TAYLOR.
     JAMES Y. TAYLOR.
     CARL C. TAYLOR.